UNITED STATES PATENT OFFICE.

WILLIAM H. WHITTEMORE, OF CHELSEA, MASSACHUSETTS.

IMPROVEMENT IN COMPOSITIONS FOR ARTIFICIAL STONE.

Specification forming part of Letters Patent No. 169,218, dated October 26, 1875; application filed August 6, 1875.

*To all whom it may concern:*

Be it known that I, WILLIAM H. WHITTEMORE, of Chelsea, in the county of Suffolk and State of Massachusetts, have invented a new Composition for Building Purposes; and I hereby declare the following to be a full, clear, and exact description of the same.

My present invention consists in a fire-proof building material, formed of alum, lime, gypsum, coke, and cement.

To enable others skilled in the art to understand and use my invention, I will proceed to describe the manner in which I have carried it out.

I take twenty (20) pounds of ordinary lime, and slake it in a sufficient quantity of water to reduce it to the consistency of paste. I then add thereto twenty (20) pounds of coke, broken into small pieces, and stir them together until they are thoroughly incorporated. I next dissolve, in another receptacle, twenty (20) pounds of alum in a sufficient quantity of water to produce a saturated solution, and mix it with the lime and coke above described; after which I add twenty (20) pounds of sulphate of lime, or gypsum, and twenty (20) pounds of Rosendale cement, and stir the whole mass until all of the ingredients are thoroughly mixed together, when it is immediately run into molds of any described shape, to form blocks and other articles used for building purposes, such as caps and sills, chimney-flues, posts, floors, &c., instead of wooden or iron articles of this description, as heretofore. The alum is employed on account of its fire-repellent quality and the tenacity with which it holds the particles together, while the gypsum is an excellent non-conductor of heat. The lime readily combines with or has an affinity for the alum, and improves the cohesion, while the coke adds to the bulk without materially increasing the weight of the composition; but coal-ashes or sawdust may be used to good advantage as substitutes therefor. The cement is used to render the composition water-proof; but when it is to be employed in situations not exposed to the weather—for instance, for partitions, floors, or ceilings—the cement may be omitted, which will not detract from its fire-proof quality.

I am aware that plaster, coke, coal-ashes, sawdust, and lime have been used to form material for building; but such composition is objectionable, for the reason that it crumbles when subjected to heat or water. This objection is, however, removed when alum forms one of the ingredients.

The proportions of the ingredients may be varied without departing from the spirit of my invention; but the quantities of either the alum or gypsum should not exceed that of the lime.

The above-described composition, in its plastic state, may be spread with a trowel or otherwise on a floor, lathed or other surface, to render them either fire or water proof.

What I claim as my invention, and desire to secure by Letters Patent, is—

A composition for building purposes, &c., formed of alum, lime, gypsum, coke, and cement, substantially as described.

Witness my hand this 3d day of August, 1875.

WILLIAM H. WHITTEMORE.

In presence of—
N. W. STEARNS,
P. E. TESCHEMACHER.